United States Patent [19]
Tanaka et al.

[11] Patent Number: 6,027,138
[45] Date of Patent: *Feb. 22, 2000

[54] CONTROL METHOD FOR INFLATING AIR BAG FOR AN AUTOMOBILE

[75] Inventors: Hideyuki Tanaka; Yasukazu Sano; Taichi Tanigawa, all of Tokyo, Japan

[73] Assignee: Fuji Electric Co., Ltd., Japan

[ * ] Notice: This patent is subject to a terminal disclaimer.

[21] Appl. No.: 08/879,821

[22] Filed: Jun. 20, 1997

[30] Foreign Application Priority Data

| Sep. 19, 1996 | [JP] | Japan | 8-247942 |
| Sep. 20, 1996 | [JP] | Japan | 8-249842 |
| Sep. 27, 1996 | [JP] | Japan | 8-256586 |
| Apr. 1, 1997 | [JP] | Japan | 9-083098 |

[51] Int. Cl.$^7$ ................................ B60R 21/32
[52] U.S. Cl. .............. 280/735; 356/376; 250/559.22
[58] Field of Search ................ 280/734, 735; 180/271, 273; 356/375, 376; 250/559.4, 559.22, 559.29, 559.32

[56] References Cited

U.S. PATENT DOCUMENTS

| 4,472,056 | 9/1984 | Nakagawa et al. | 356/376 |
| 4,490,036 | 12/1984 | Anagnostopoulos | 356/1 |
| 4,553,844 | 11/1985 | Nakagawa et al. | 356/376 |
| 5,071,160 | 12/1991 | White et al. | 280/735 |
| 5,118,134 | 6/1992 | Mattes et al. | 280/735 |
| 5,300,767 | 4/1994 | Steinle et al. | 250/208.1 |
| 5,330,226 | 7/1994 | Gentry et al. | 280/735 |
| 5,398,185 | 3/1995 | Omura | 280/735 |
| 5,446,661 | 8/1995 | Gioutsos et al. | 364/424.05 |
| 5,454,591 | 10/1995 | Mazur et al. | 280/735 |
| 5,460,405 | 10/1995 | Faigle et al. | 280/735 |
| 5,482,314 | 1/1996 | Corrado et al. | 280/735 |
| 5,490,069 | 2/1996 | Gioutsos et al. | 280/735 |
| 5,528,698 | 6/1996 | Kamei et al. | 280/735 |
| 5,531,472 | 7/1996 | Semchena et al. | 280/735 |
| 5,602,944 | 2/1997 | Yokoyama et al. | 382/278 |
| 5,605,348 | 2/1997 | Blackburn et al. | 280/735 |
| 5,626,359 | 5/1997 | Steffens, Jr. et al. | 280/735 |
| 5,653,462 | 8/1997 | Breed et al. | 280/735 |
| 5,702,123 | 12/1997 | Takahashi et al. | 280/735 |
| 5,782,485 | 7/1998 | Takeda et al. | 280/735 |
| 5,856,832 | 1/1999 | Pakenham et al. | 345/523 |

FOREIGN PATENT DOCUMENTS

| 738633 A1 | 10/1996 | European Pat. Off. . |
| 4023109 | of 0000 | Germany . |
| 4023109 | 1/1992 | Germany . |
| 60-015506 | 1/1985 | Japan . |
| 60-061611 | 4/1985 | Japan . |
| 8-169289 | 7/1996 | Japan . |

*Primary Examiner*—Paul N. Dickson
*Assistant Examiner*—Lynda Jasmin
*Attorney, Agent, or Firm*—Rossi & Associates

[57] ABSTRACT

The present invention detects not only the presence of an occupant, but also his/her posture based on the distance distribution of each portion of the occupant within each of monitor fields of view, which distance distribution is obtained by means of a single-stage or multistage occupant sensor. The result of the detection can be used in controlling inflation of an air bag, so as to avoid an accident that might otherwise occur upon inflation of the air bag, thus assuring increased safety and reliability. Since the acceleration can be calculated by arithmetic processing of the output of the distance sensor, there is no particular need to provide an exclusive acceleration sensor. Further, an optical system including the distance sensor may be designed so that the sensor can also detect an occupant whose part of the body is thrust out of automobile.

8 Claims, 21 Drawing Sheets

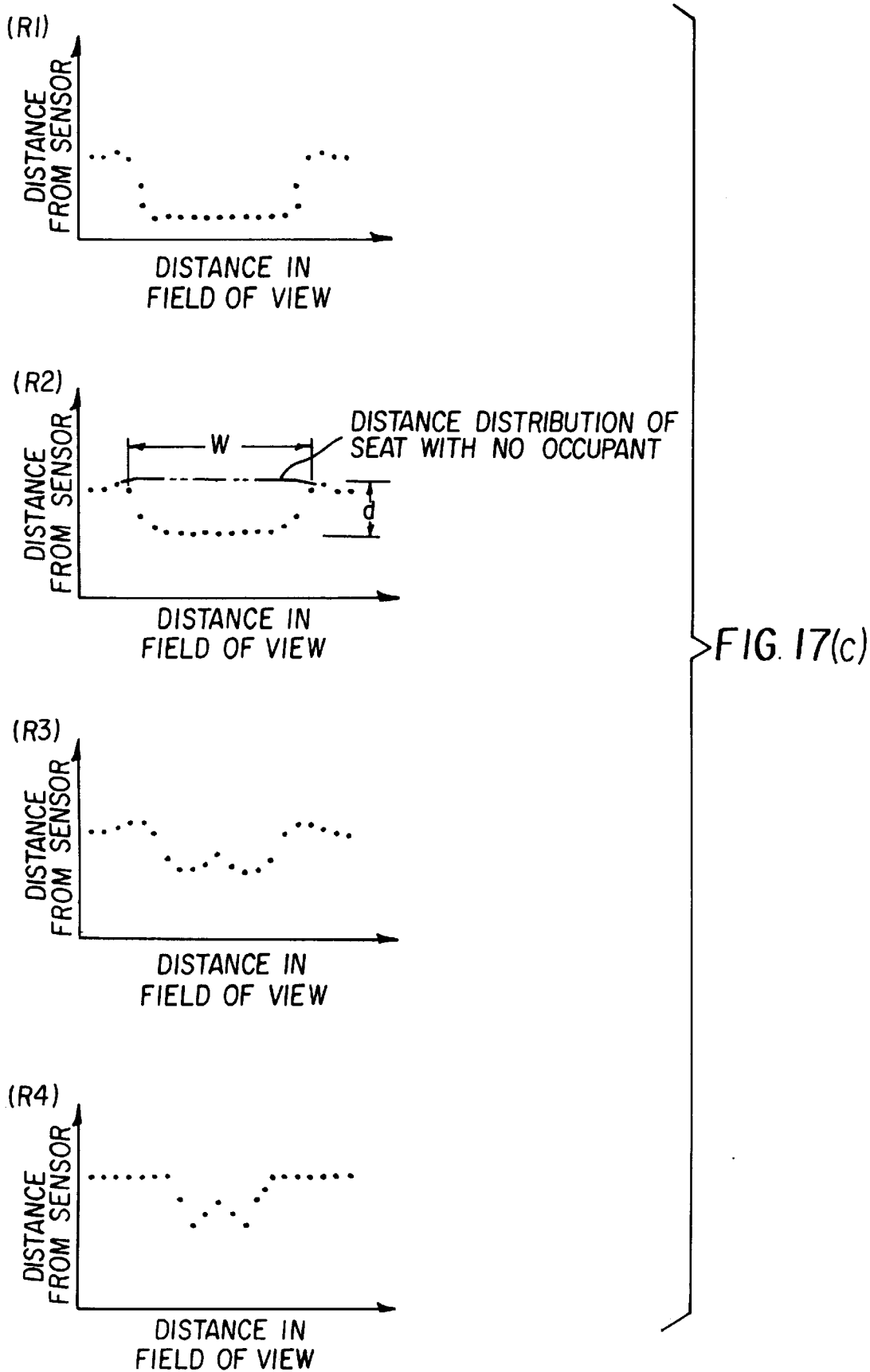

CONTROL METHOD FOR INFLATING AIR BAG FOR AN AUTOMOBILE

FIELD OF THE INVENTION

The present invention relates to a control method for inflating an air bag for an automobile, by detecting the presence and posture of the occupant of an automobile, in particular, using linear photosensor arrays each consisting of a plurality of photosensor elements.

BACKGROUND

In recent automobiles, an air bag which is instantly inflated upon a collision of the automobile is often installed as a safety device for alleviating an impact or shock.

FIG. 21 schematically shows a conventional example of a system for controlling inflation of an air bag. In this figure, reference numeral 30 denotes an air bag, 31 denotes an accelerator sensor, for example, 32 denotes an AND gate, and 33 denotes a drive device. More specifically, a switch is provided in a buckle of a seat belt, to be operated when an occupant buckles up or puts on the seat belt, or an infrared sensor is provided around a dashboard of the automobile. The output of the switch or infrared sensor is used to generate a signal indicative of the presence of the occupant. The air bag 30 is inflated when an AND gate 32 receives this signal indicative of the presence of the occupant, along with an accident signal generated by the acceleration sensor 31, and the logical product (AND) of these signals is established in the AND gate 32. The solid line indicates the air bag 30 when it is accommodated in a case, while the broken line indicates the air bag 30 when it is inflated or unfolded.

In the conventional arrangement in which the air bag is inflated without fail if an accident occurs in the presence of an occupant, there arises a new problem that an additional accident may be caused by inflation of the air bag depending upon the posture of the occupant.

Specific examples of this situation are shown in FIG. 22. FIG. 22(a) shows an occupant 2 who sits on a seat while leaning forward, and FIG. 22(b) shows an occupant 2A who is a small child or a baby, for example, when seated in a child seat 5 that faces opposite to the traveling direction of the automobile 3. In these cases, if the air bag is inflation upon occurrence of a collision, the occupant 2 or the small child or baby 2A may be hit by the inflating air bag, possibly resulting in a serious accident. In the case where an occupant is in a normal, safe position as shown in FIG. 23, no accident due to inflation of the air bag occurs when the air bag is inflated.

It is therefore an object of the present invention to avoid an accident due to inflation of the air bag, so as to improve the safety of the air bag system.

SUMMARY OF THE INVENTION

To accomplish the above object, the invention provides at least one pair of linear photosensor arrays each consisting of a plurality of photosensor elements are provided for forming an image of an occupant, so as to measure distance distribution of the image of the occupant located in at least one linear field of view, and detect the presence and posture of the occupant, so that the inflation of the air bag is controlled based on a result of detection of the presence and posture of the occupant.

In the above-described invention, at least two pairs of the photosensor arrays may be provided, and at least one of the at least two pairs of the photosensor arrays may define a field of view at a predetermined position in a horizontal direction, so that warning can be given when the image of the occupant is detected at a predetermined distance in the horizontal direction as measured from the at least one pair of the photosensor arrays. Also, an acceleration of movement of the occupant may be detected based on a rate of changes per unit time of distance values measured by the photosensor arrays, so that the detected acceleration can be used for controlling inflation of the air bag.

According to a further embodiment, at least one pair of linear photosensor arrays each consisting of a plurality of photosensor elements and a galvano-mirror are provided for successively forming an image of an occupant, so as to measure distance distribution of the image of the occupant located in at least one linear field of view, and detect the presence and posture of the occupant, so that the inflation of the air bag is controlled based on a result of detection of the presence and posture of the occupant.

The photosensor arrays may be provided with respective lenses such that the sensor arrays and the lenses are integrally formed using a transparent resin, and a shielding coating may be applied to portions of the lenses other than effective portions thereof. An auxiliary light source for illuminating the linear fields of view may be added, and the auxiliary light source may be turned on to emit a high intensity of light when an acceleration becomes equal to or greater than a predetermined value, for measurement of the distance distribution. The auxiliary light source may comprise a semiconductor laser light source, and a hologram that receives a laser beam emitted by the semiconductor laser light source, and generates a pattern of stripes that extend in a direction perpendicular to the linear fields of view.

Each of a pair of linear photosensor arrays each consisting of a plurality of photosensor elements is divided into a plurality of regions, and a lens is provided with respect to each of the regions, so as to form an image of a part of an occupant on a corresponding one of the regions, at least one distance distribution of the image of the part of the occupant being measured so as to detect the presence and posture of the occupant, so that the inflation of the air bag is controlled based on a result of detection of the presence and posture of the occupant.

A plurality of pairs of linear photosensor arrays each consisting of a plurality of photosensor elements are provided for forming an image of an occupant, so as to measure distance distribution of the image of the occupant located in at least one linear field of view, and detect the presence and posture of the vehicle occupant, while at the same time calculating the width and thickness of a cross section formed in the distance distribution to represent an abdominal portion of the vehicle occupant, so as to detect the weight of the occupant by reading out information preliminarily stored in relation to the width and thickness, so that the inflation of the air bag is controlled based on a result of detection of the presence and posture of the occupant and the weight of the occupant

DETAILED DESCRIPTION OF THE PREFERRED EMBODIMENTS

Figure 1:
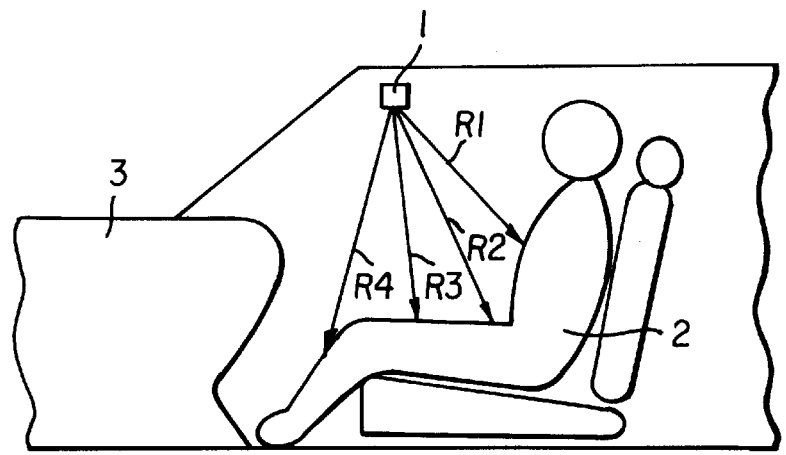
FIG. 1 is a schematic view for explaining the first embodiment of the present invention.

FIG. 1 is a schematic view for explaining one embodiment of the present invention. In this embodiment, an image of an occupant 2 is formed by an occupant sensor 1, which defines four linear monitor regions (fields of view) R1, R2, R3 and R4 with respect to the occupant 2, and generates outputs representing a plurality of portions of the occupant located in the respective fields of view. A processing unit that is not illustrated arithmetically processes the outputs of the occupant sensor, to measure distances from the sensor to the respective portions of the occupant, thereby to determine not only the presence of the occupant but also his/her posture.

Figure 2:
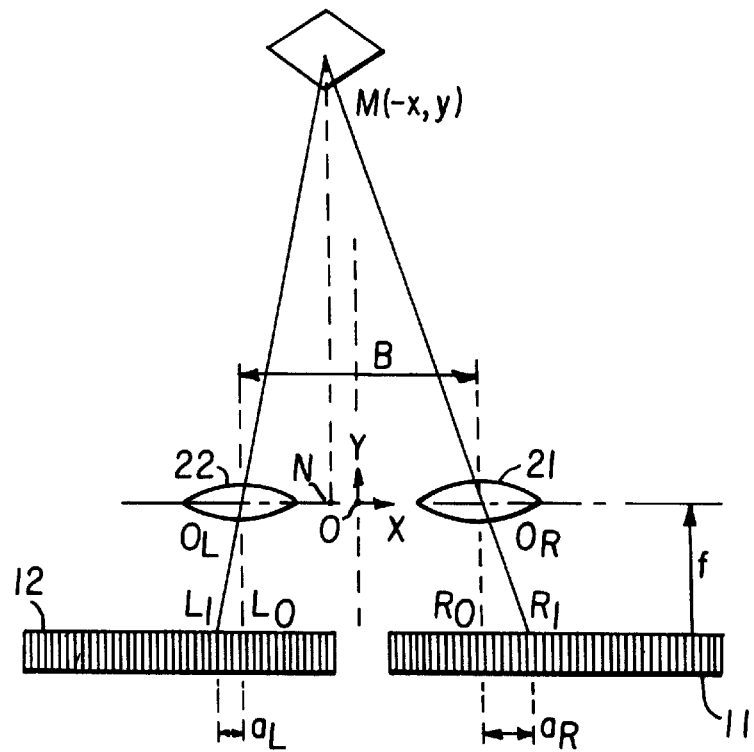
FIG. 2 is a view explaining the principle of measuring distances.

The principle of measurement of distances will be explained referring to FIG. 2. The horizontal axis X and vertical axis Y are plotted with respect to the origin O located at the center of imaging lenses 21, 22, and the coordinates of focal positions or points $L_1$, $R_1$ are set to be $(-a_L - B/2, -f)$, $(a_R + B/2, -f)$. The coordinates of the center point OL of the imaging lens 22 are $(-B/2, 0)$, and the coordinates of the center point OR of the imaging lens 21 are $(B/2, 0)$. If the coordinates of a point M of an object (subject) are set to be $(-x, y)$, the coordinates of the intersection "N" of the vertical line or normal extending from the point M toward the X-axis and the X-axis is $(-x, 0)$, and the coordinates of the position L0 at which the vertical line extending from the point $O_L$ intersects with a photosensor array 12 are $(-B/2, -f)$, while the coordinates of the position R0 at which the vertical line extending from the point $O_R$ intersects with a photosensor array 11 are $(B/2, -f)$.

In this arrangement, $a_L$ represents the distance between the point L0 and the point L1, and $a_R$ represents the distance between the point R0 and the point R1. Since $\Delta MO_L N$ and $\Delta O_L L_1 L_0$ are similar triangles, and $\Delta MO_R N$ and $\Delta O_R R_1 R_0$ are also similar triangles, the equations as follows are established:

$$(-x+B/2) f = a_L \cdot y \quad (1)$$

$$(x+B/2) f = a_R \cdot y \quad (2).$$

By eliminating x from the above equations (1), (2), the following equation:

$$y = B \cdot f / (a_L + a_R) \quad (3)$$

is obtained. If the distance $a_L$ between the focal position $L_1$ of the left photosensor array 12 and the point $L_0$ and the distance $a_R$ between the focal position $R_1$ of the right photosensor array 11 and the point $R_0$ are known, the distance y from the origin to the object can be calculated from the equation (3).

Figure 3:
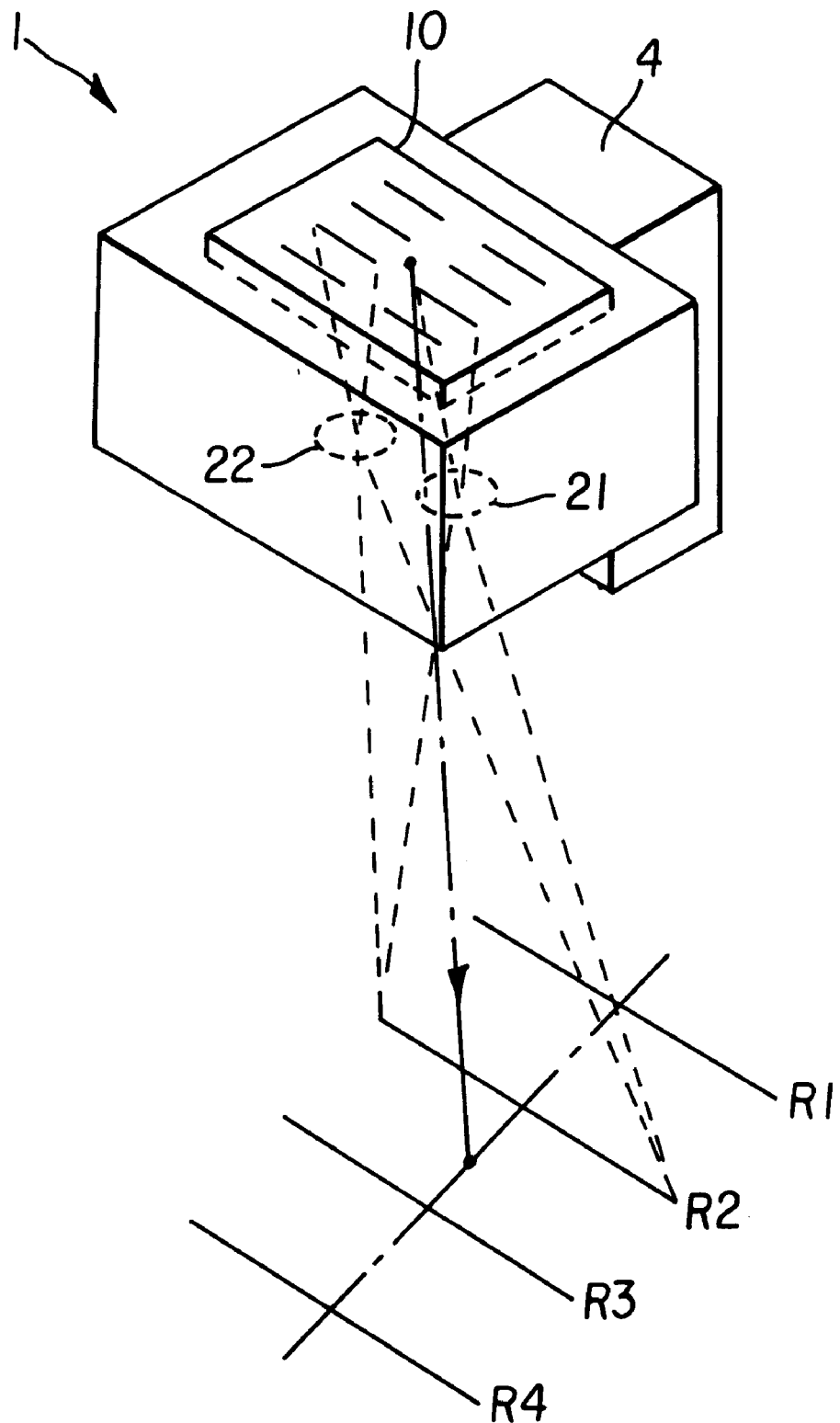
FIG. 3 is a view for explaining the relationship between photosensor arrays used in the embodiment of FIG. 1 and the fields of view.

FIG. 3 shows one example of the occupant sensor used in the embodiment of FIG. 1. More specifically, the occupant sensor 1 is constructed by integrating a multistage photoresponsive IC 10 comprised of four pairs of photosensor arrays, with the imaging lenses 21, 22. Although any number of pairs of sensor arrays may be provided, a four-stage arrangement consisting of four pairs of sensor arrays is employed in this example, so as to define a plurality of monitor regions or fields of view R1, R2, R3, R4.

Figure 4:
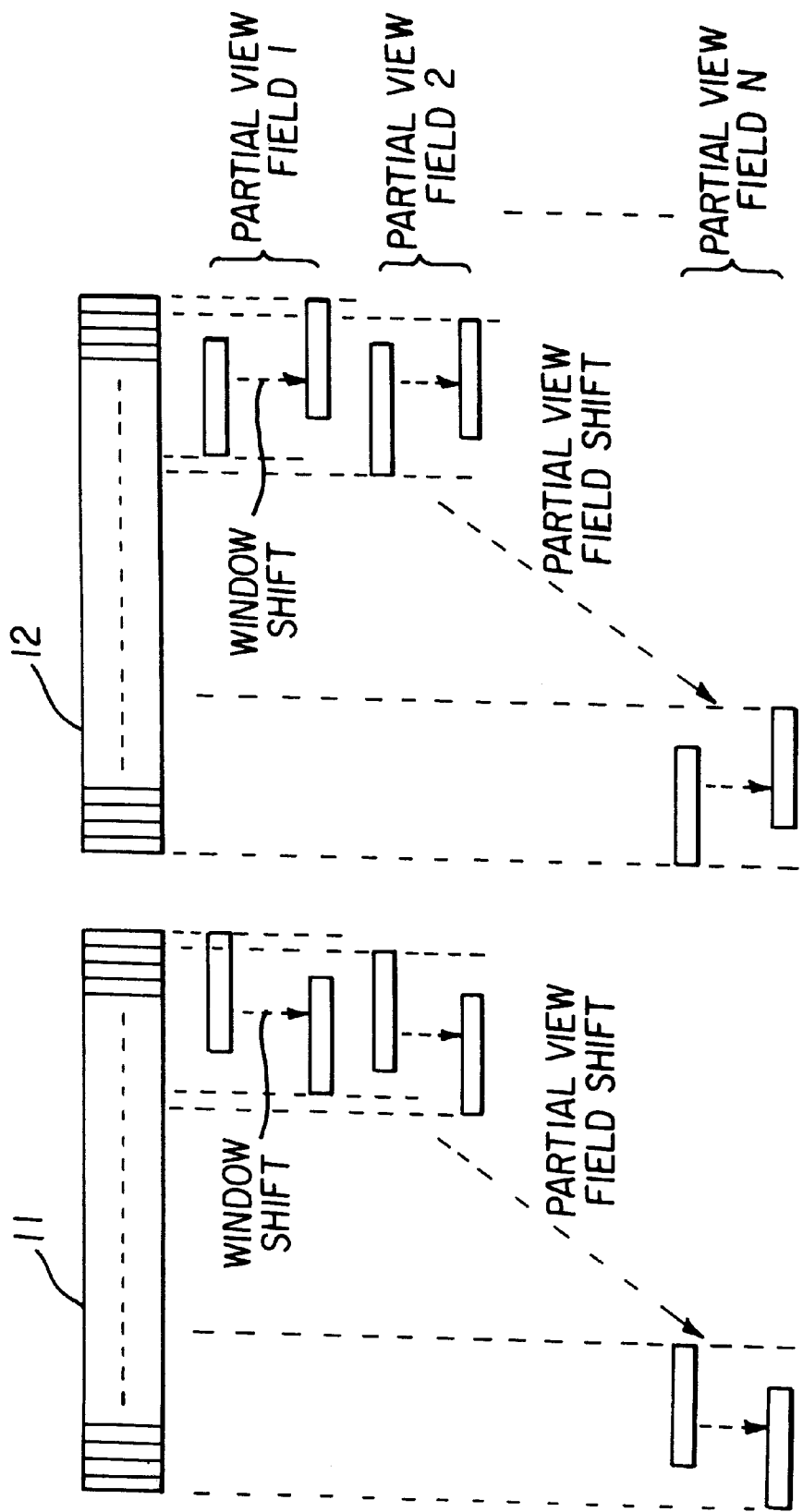
FIG. 4 is a view explaining a correlation operation used in measurement of distances.
Figure 5:
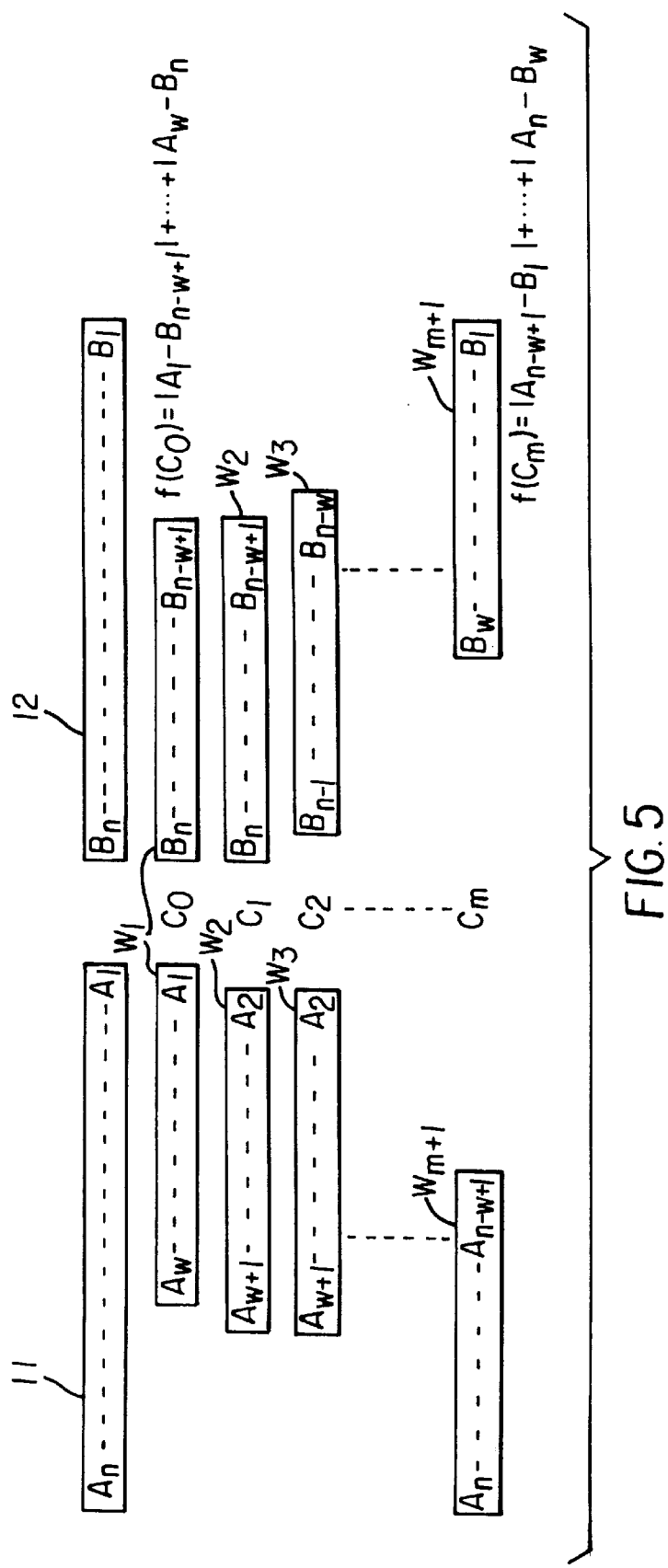
FIG. 5 is a view explaining the principle of measuring distances of multiple points.

The distribution of distances obtained by the sensor as shown in FIG. 3 is represented as discrete values, as described in detail below. The left and right photosensor arrays 11, 12 each consisting of n pieces of photosensor elements as shown in FIG. 4 produce quantized data in the form of $A_1 - A_n$, $B_1 - B_n$, respectively. To obtain the index $(a_L + a_R)$ of the distance from the front face of the sensor to the object that forms a certain angle with respect to the front face (the angle formed by the Y-axis and the line connecting the object having the coordinates "M" with the origin O in FIG. 3), observation regions (windows) $W1 - W_{m+1}$ each having a predetermined size are set with respect to the above data, as shown in FIG. 5, so as to provide subsets $C_0 - C_m$ having (m+1) pairs of windows which are alternately shifted by one sensor unit (1 bit). Then, the evaluation function $f(C_0) - f(C_m)$ for each subset is calculated which consists of the sum of absolute values of differences between corresponding quantized data, and the subset or combination $C_k$ in which the evaluation function gives the minimum value is obtained, so that the degree of shift of left and right images is calculated based on the value of the subscript "k". Thus, the distance index that is proportional to $(a_L + a_R)$ as shown in the above equation (3) can be obtained.

If the processing as shown in FIG. 5 is performed with respect to 1 to n pieces of fields of view, while successively shifting the windows by one bit at a tine, for example, n pieces of discrete distance data can be obtained.

The output from the occupant sensor as shown in FIG. 3 is processed by the processing unit that is not illustrated, so as to accomplish measurement of the distance to each portion of the occupant.

Figure 6A:
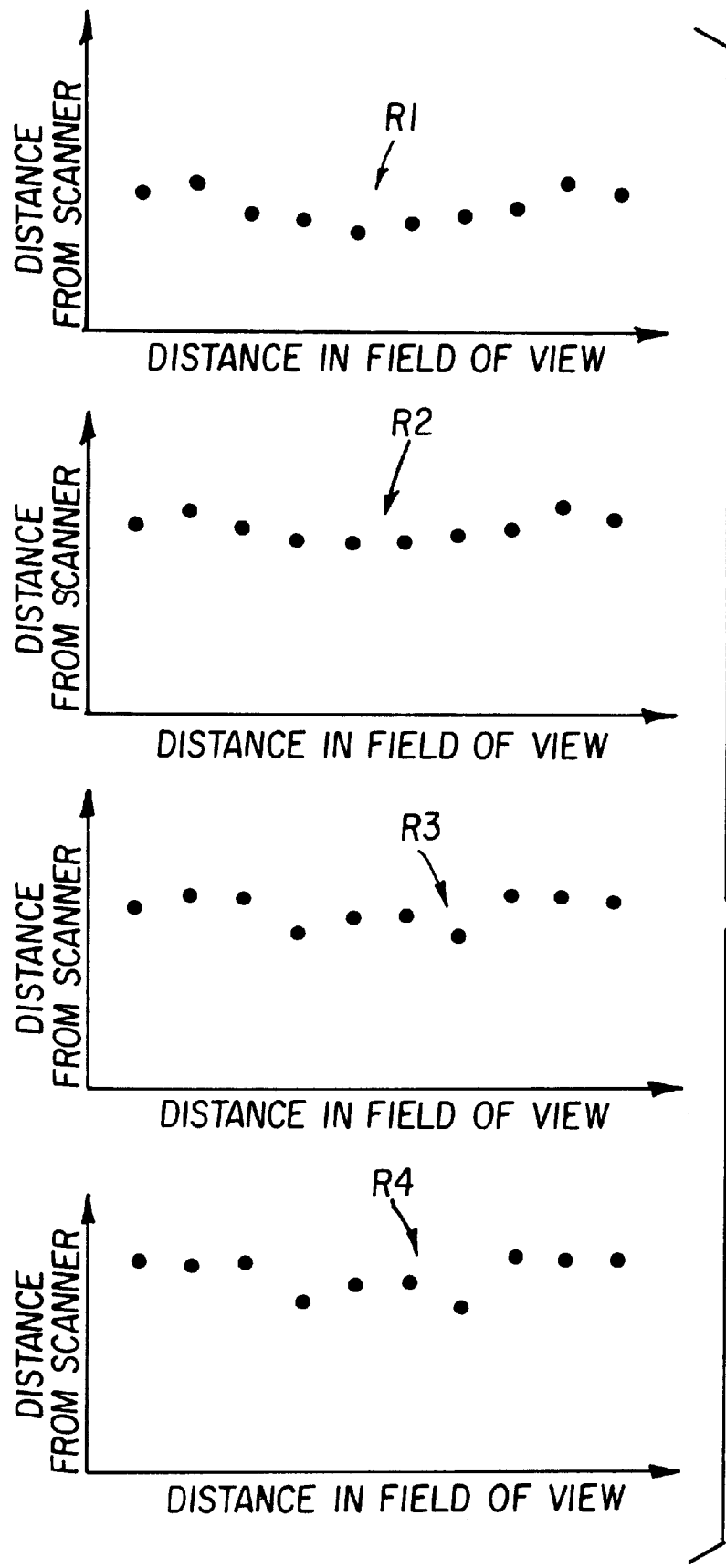
FIG. 6 is an explanatory view showing an example of distance distribution of an occupant with respect to each field of view.
Figure 6B:
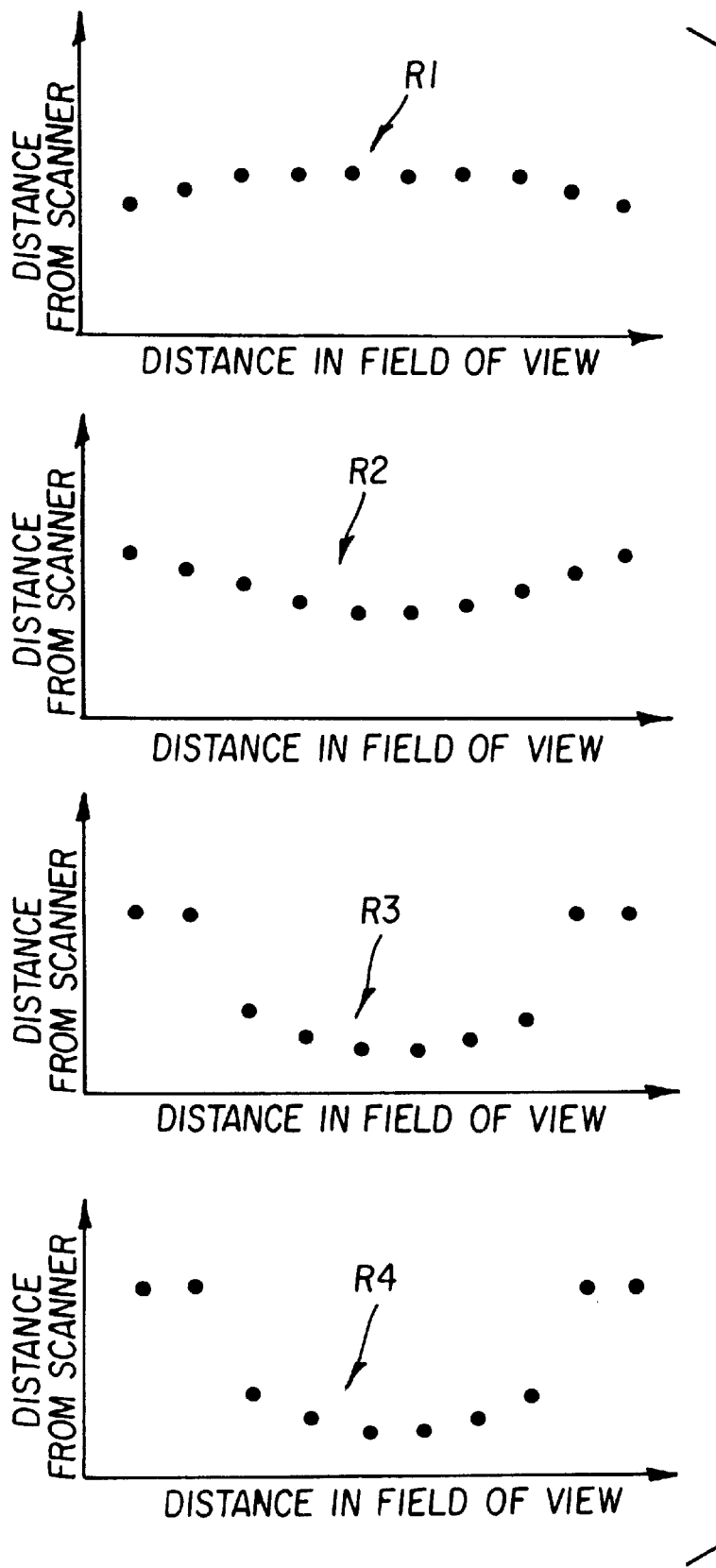
Figure 7A:
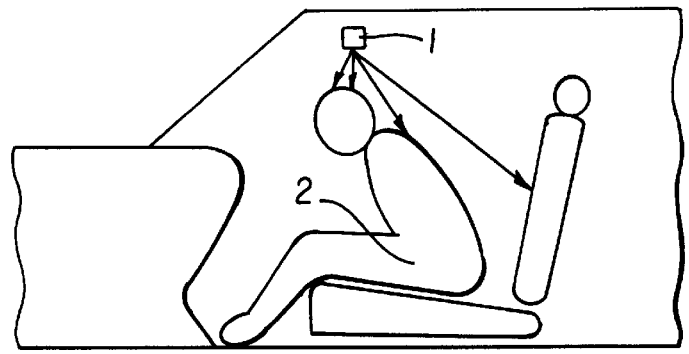
FIG. 7 is a view explaining various postures of the occupant.

If the occupant sensor as shown in FIG. 3 is used to set the fields of views R1–R4 with respect to the occupant 2 as shown in FIG. 1, the distance distribution in each field of view R1, R2, R3, R4 is such as shown in FIG. 6(a), for example. Where the occupant leans forward as shown in FIG. 7(a), on the other hand, the distance distribution is such as shown in FIG. 6(b). Since the distances are discretely measured by the respective photosensor arrays, the measured distances are represented as discrete or noncontinuous values as shown in the figures.

Figure 7B:
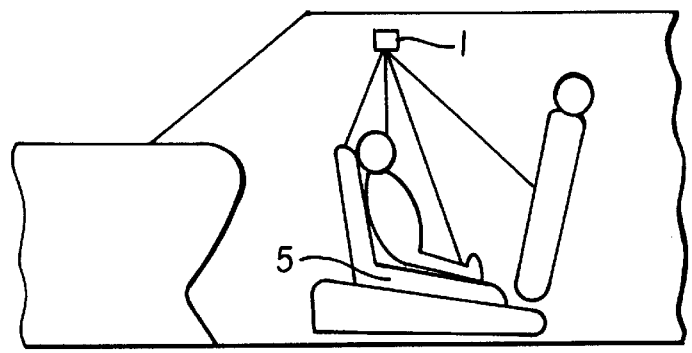
Figure 7C:
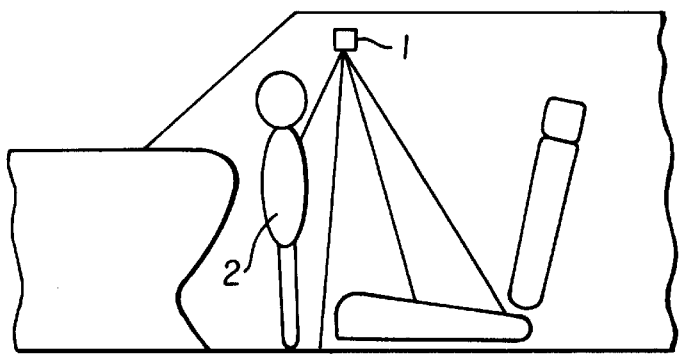

Similarly, where an occupant is sitting on a child sheet 5 as shown in FIG. 7(b), or where a occupant is standing around a dashboard as shown in FIG. 7(c), the distance distributions corresponding to the respective postures will be obtained. Accordingly, if data for each posture of the occupant are prepared in advance and stored in the processing unit that is not illustrated, for example, the posture of the occupant can be judged by comparing the obtained distance distribution with patterns preliminarily stored in the processing unit.

Recently, accidents sometimes occur when an occupant has a part of his/her body thrust out of a roof of an automobile equipped with a roof window, for example.

Figure 8:
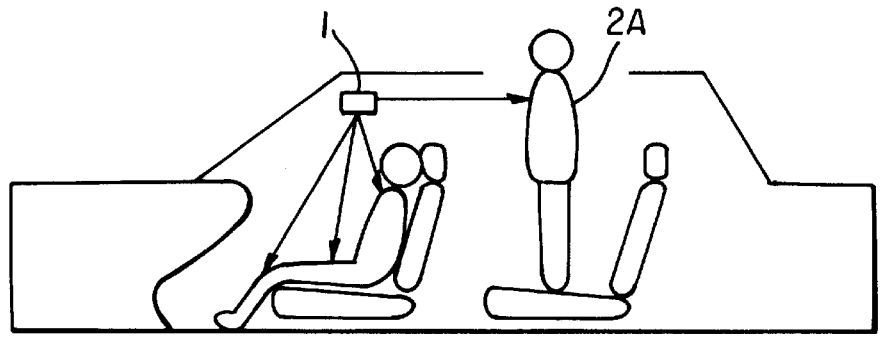
FIG. 8 is a schematic view showing the second embodiment of the present invention.

FIG. 8 is a schematic view showing the second embodiment of the present invention which deals with this situation. A detecting system including the occupant sensor 1 is constructed as shown in the figure, so as to give warning before such an accident occurs. Where the occupant sensor 1 includes a plurality of pairs of photosensor arrays, one pair (R4) of the photosensor arrays may be used to monitor the position at a given height of the automobile, and, if these sensor arrays detect an occupant 2A as shown in FIG. 8, the sensor judges that a part of the occupant's body appears above the vehicle roof, and gives warning.

Figure 9:
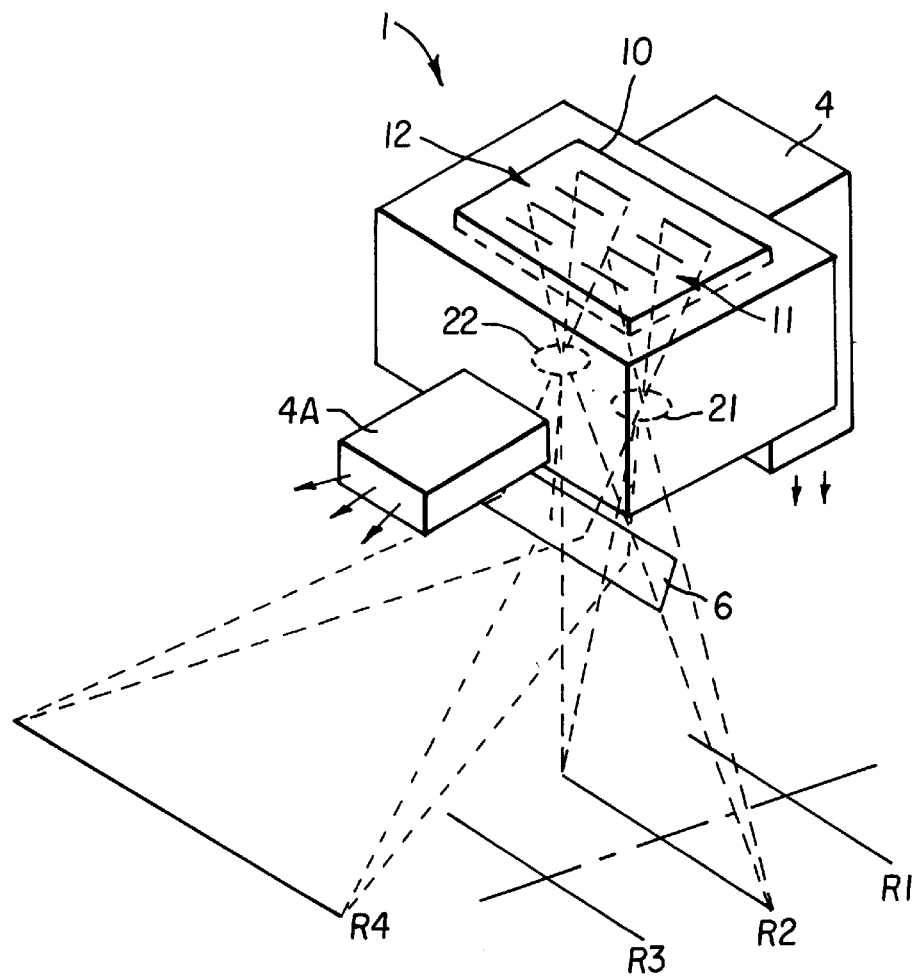
FIG. 9 is a view explaining the relationship between photosensor arrays used in FIG. 8 and corresponding fields of view.

FIG. 9 shows a specific example of an optical system used in this embodiment. In this occupant sensor, multistage photoresponsive IC 10 comprised of four pairs of photosensor arrays is integrally assembled with imaging lenses 21, 22, as in the occupant sensor 1 of FIG. 3, and a turn-around mirror 6 is provided for guiding an image of the occupant from the field of view R4, for example, toward the sensor. Reference numerals 4, 4A denote auxiliary light sources used for detection in a dark environment (when it is dark at night, for example).

Figure 10A:
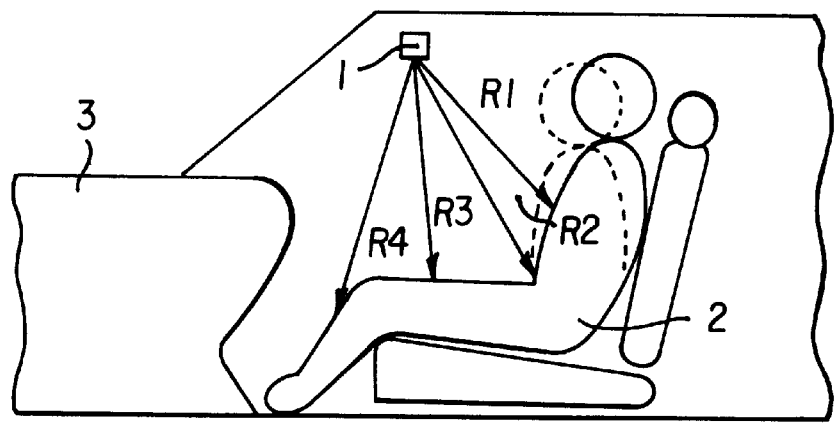
FIG. 10 is a schematic view showing the third embodiment of the present invention.
Figure 10B:
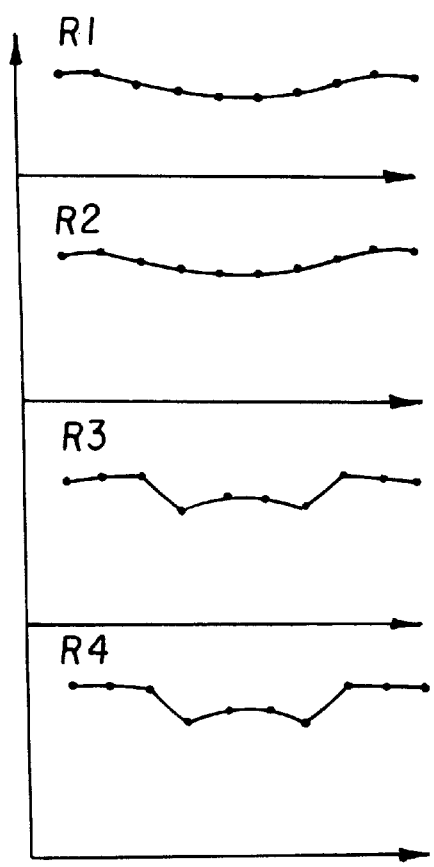
Figure 10C:
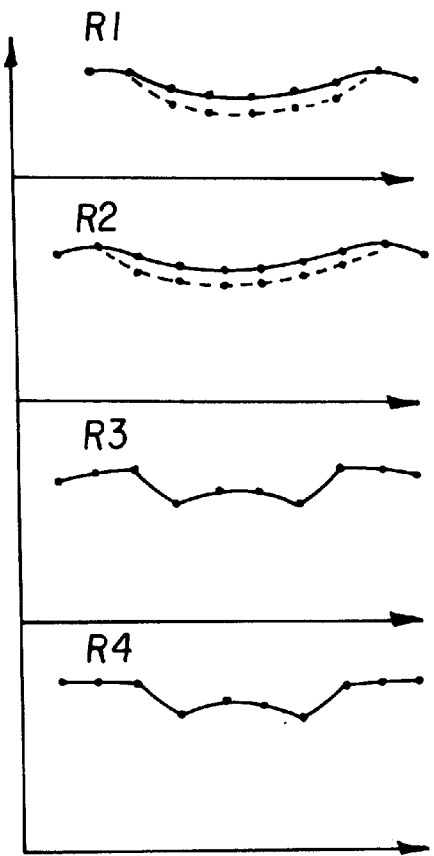
Figure 21:
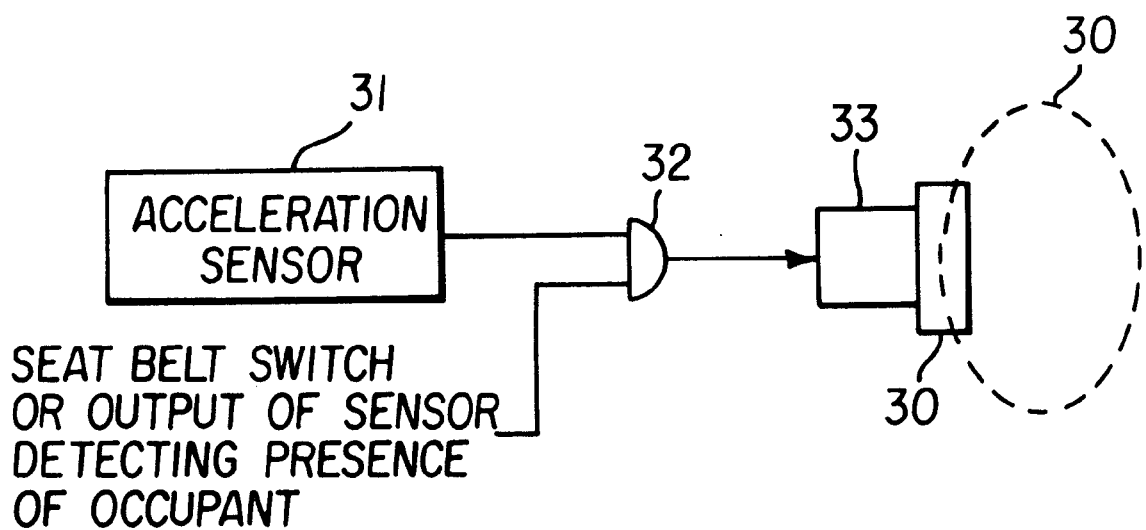
FIG. 21 is a schematic view showing a conventional example of controlling inflation of an air bag.
Figure 22A:
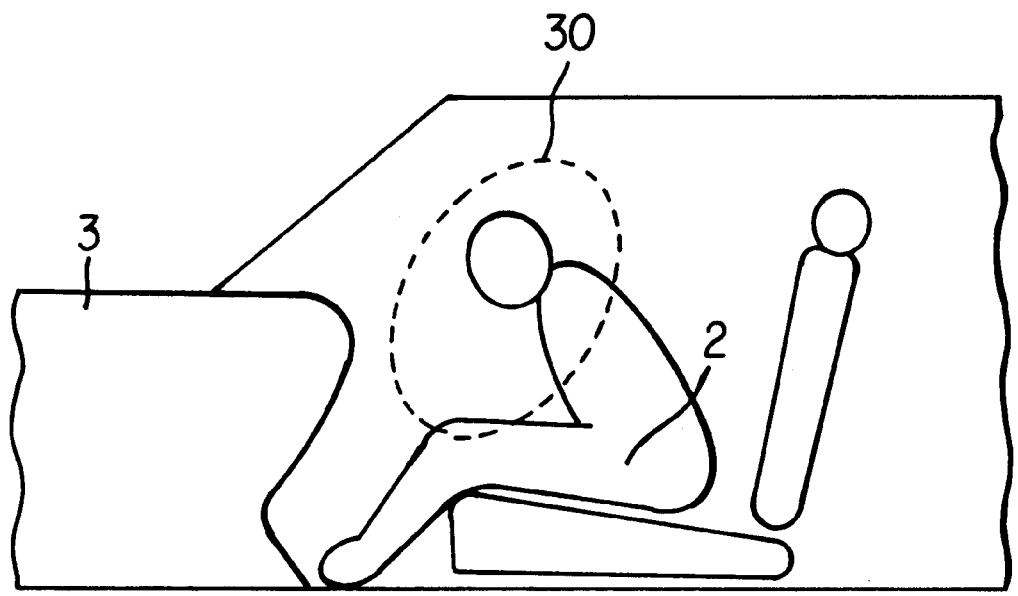
FIG. 22 is a view explaining dangerous postures of occupants when an air bag is inflated.
Figure 22B:
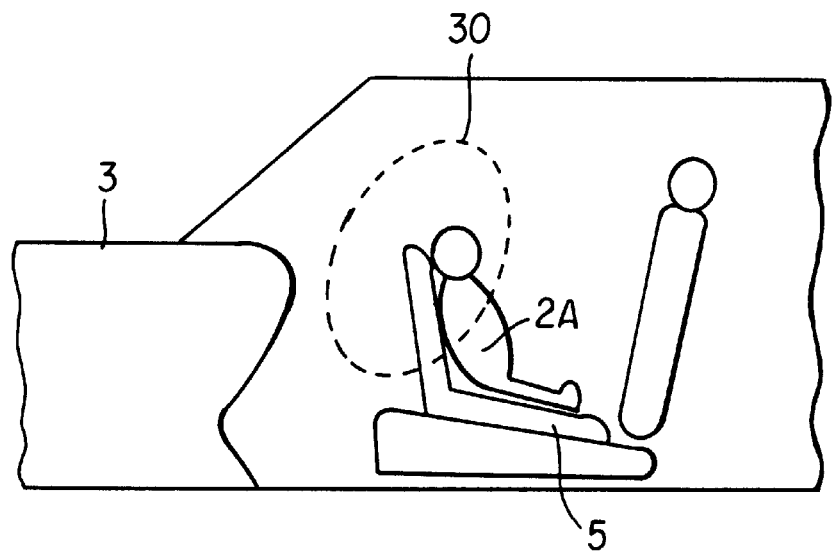
Figure 23:
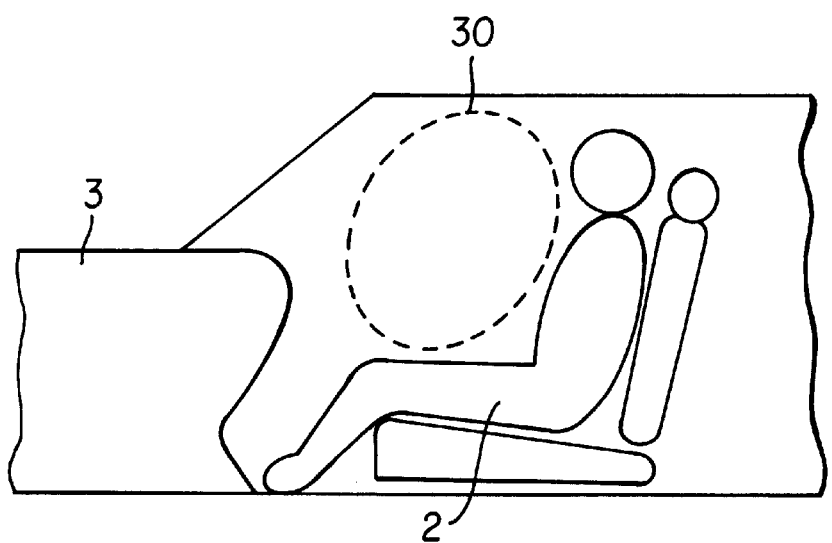
FIG. 23 is a view showing a condition in which an occupant is in a normal posture.

FIG. 10 is a view for explaining the third embodiment of the present invention. In this embodiment, an example of application of the sensor output will be explained. FIG. 10(a) shows the relationship between an occupant and an occupant sensor, and FIG. 10(b) shows the distance distribution of each portion of the occupant body within each of the fields of view R1–R4 where the occupant takes the posture as indicated by solid line in FIG. 10(a). FIG. 10(c) shows the distance distribution where the occupant takes the posture as indicated by solid line in FIG. 10(a), and the distance distribution where the occupant takes the posture as indicated by broken line in FIG. 10(a), wherein curves indicating these distance distributions are superposed on each other. In this case, the acceleration of the occupant can be obtained by calculating the rate of change in a difference between these distance distributions per unit time. Accordingly, there is no need to provide an acceleration sensor as shown in FIG. 21, and the cost can be thus reduced.

Figure 11:
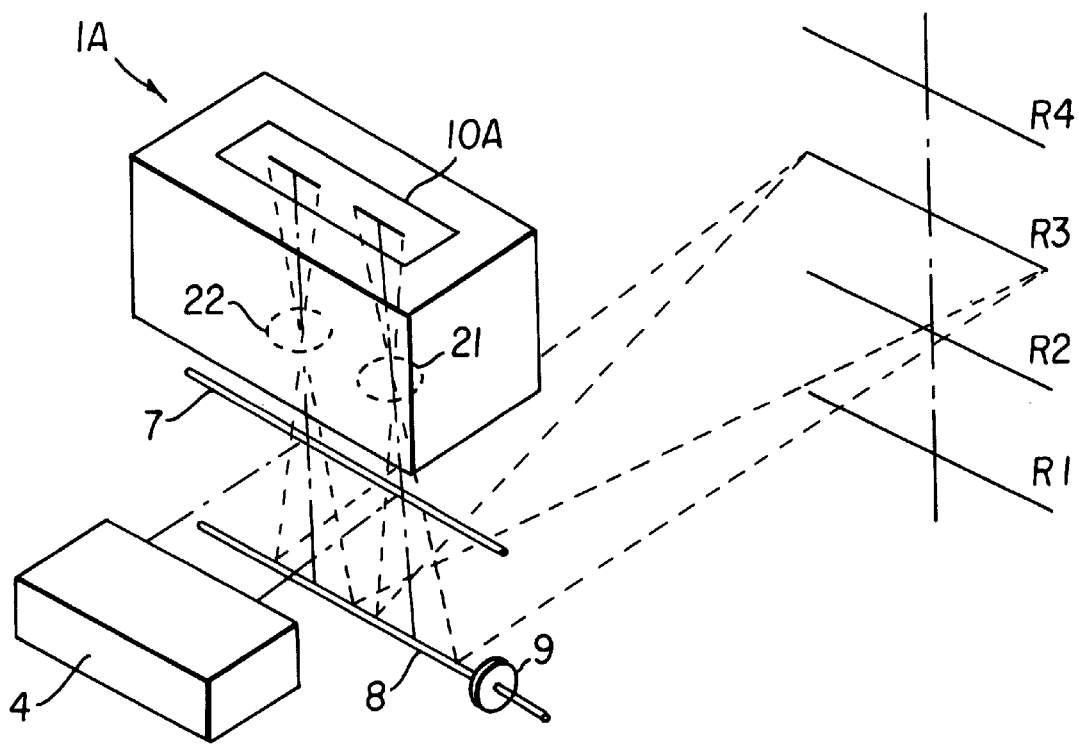
FIG. 11 is a schematic view showing the fourth embodiment of the present invention.

FIG. 11 is a schematic view showing the fourth embodiment of the present invention. While the occupant sensor of FIG. 3 is provided with four pairs of photosensor arrays, which respectively receive images of an occupant from four fields of view R1–R4, the occupant sensor 1A of the embodiment of FIG. 11 comprises a single-stage photoresponsive IC (which may be simply referred to as photoresponsive IC: 10A) consisting of a pair of photosensor arrays, and imaging lenses 21, 22, for receiving images of an occupant from a plurality of fields of view (four fields of view R1–R4 in this embodiment). In order to guide the images of the occupant in the plural fields of view toward the single pair of photosensor arrays, a semitransparent mirror (half mirror) 7, galvano-mirror 8, and a mirror drive portion 9 are provided, such that the galvano-mirror 8 is rotated by the mirror drive portion 9 so as to successively scan the fields of view.

Figure 12A:
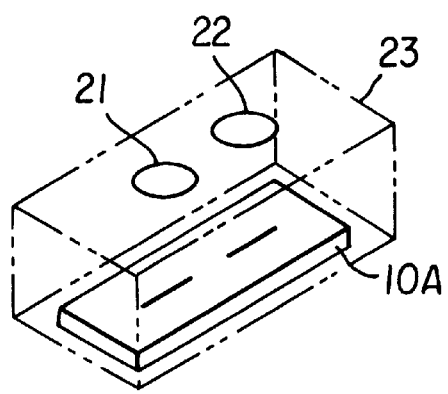
FIG. 12 is a view showing specific examples of occupant sensor used in the embodiment of FIG. 11.

FIG. 12 shows a specific example of the occupant sensor used in the embodiment of FIG. 11. In the example of FIG. 12, the single-stage photoresponsive IC (10A) and the lenses 21, 22 are accommodated in a case 23. This arrangement, however, may result in increases in the overall size and the cost of the sensor.

Figure 12B:
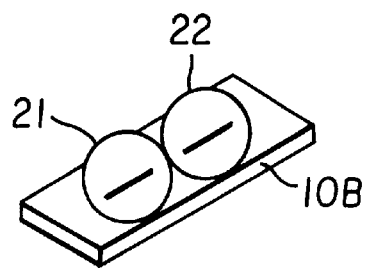

In view of the above problem, the lenses 21, 22 may be formed integrally on a light-receiving surface of the photoresponsive IC (10B) that is made of resin, as shown in FIG. 12(b), thereby to reduce the number of components and the size and cost of the sensor. A shielding coating is desirably applied to portions of the lenses 21, 22 other than their effective portions, so as to prevent the lenses 21, 22 from receiving stray light (light emitted by an automobile rung on the opposite lane or running behind the present automobile).

Figure 13:
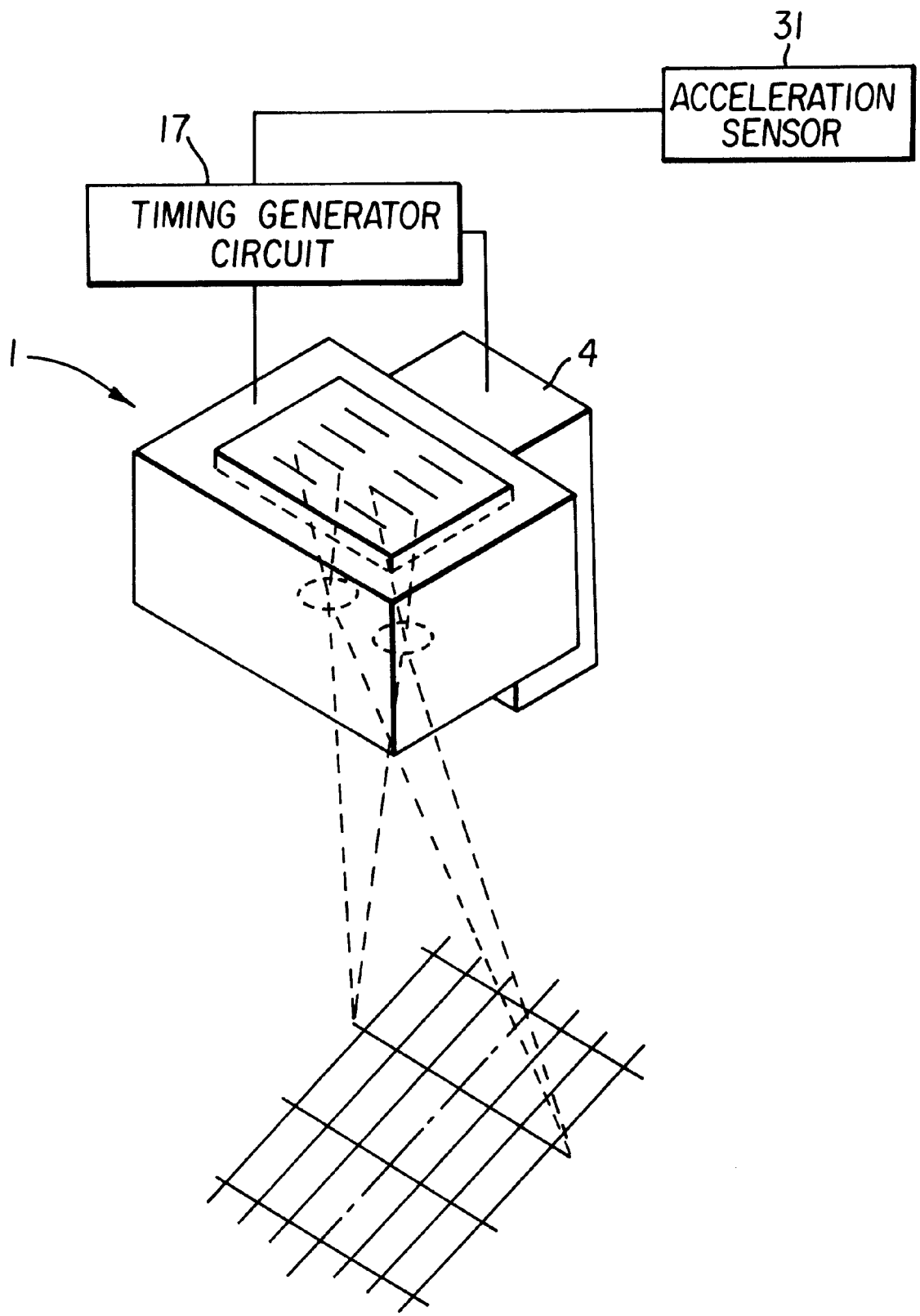
FIG. 13 is a view for explaining the fifth embodiment of the present invention.

FIG. 13 is a schematic view showing the fifth embodiment of the present invention. In this embodiment, a timing generating circuit 17 is provided in connection with an auxiliary light source 4, and is adapted to give an output of an acceleration sensor 31 to the auxiliary light source 4 as a trigger signal, so as to cause the light source 4 to emit a high intensity of light. Although the auxiliary light source 4 normally emits a low intensity (low luminance) of light so as not to reduce its lifetime, the accuracy in measuring the distance is lowered as the intensity of the light is lowered. Therefore, if a certain acceleration equal to or greater than that caused by a collision of the vehicle is detected by the acceleration sensor 13, the output of the sensor 31 is applied through the timing generating circuit 17 to the auxiliary light source 4 so as to cause the light source 4 to emit a high intensity (high luminance) of light, avoiding reduction in the distance measuring accuracy.

Figure 14:
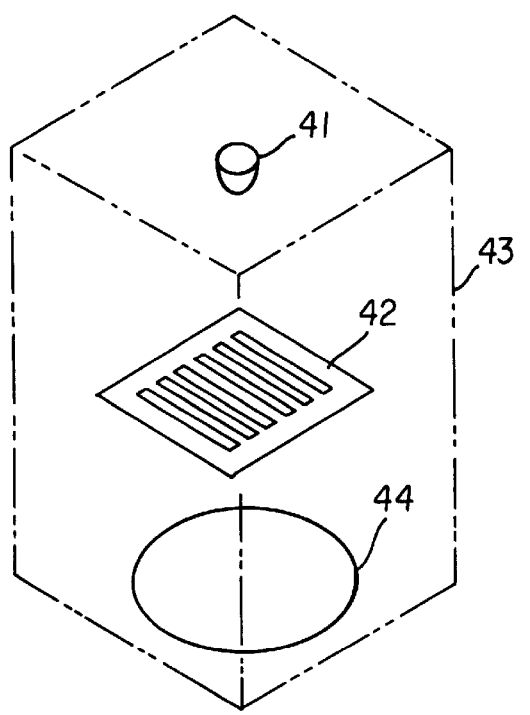
FIG. 14 is a schematic view showing an example of auxiliary light source.
Figure 14:
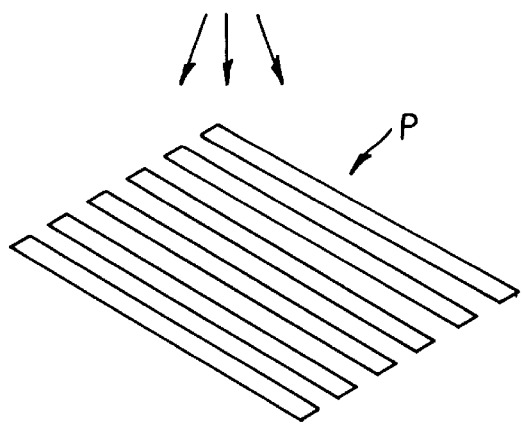
Figure 15:
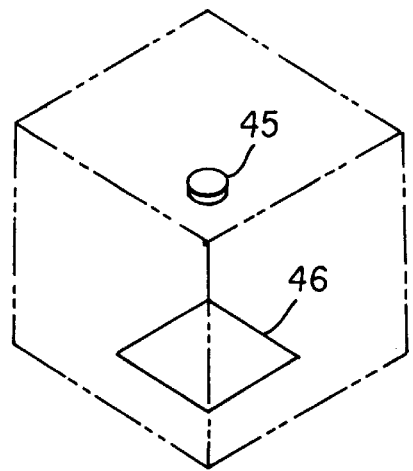
FIG. 15 is a schematic view showing another example of auxiliary light source.
Figure 15:
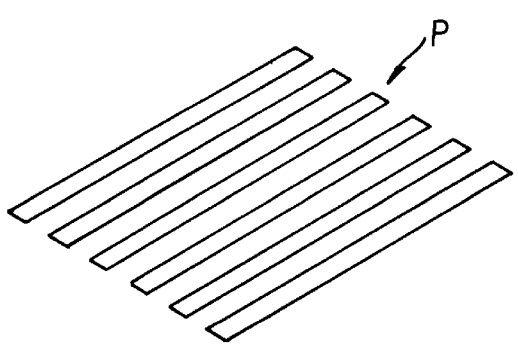

Since the above-described auxiliary light source is mainly used at night when a quantity of the ambient light is small, it is desirable that the light source is capable of generating a large quantity of auxiliary light. To this end, a slit plate 42 may be provided between LED (light-emitting diode) 41 and lens 44, as shown in FIG. 14 by way of example, so that the light passing through the slit plate 42 forms a stripe-shaped pattern P. Reference numeral 43 denotes a case. In this arrangement, however, the number of components is increased, and it takes time and effort to assemble these components together.

In view of the above problem, the auxiliary light source may consist of a LD (laser diode) and hologram 46. The light source thus constructed is able to generate auxiliary light having a high intensity, with increased efficiency of use of a given quantity of light, assuring improved measuring accuracy.

Figure 16A:
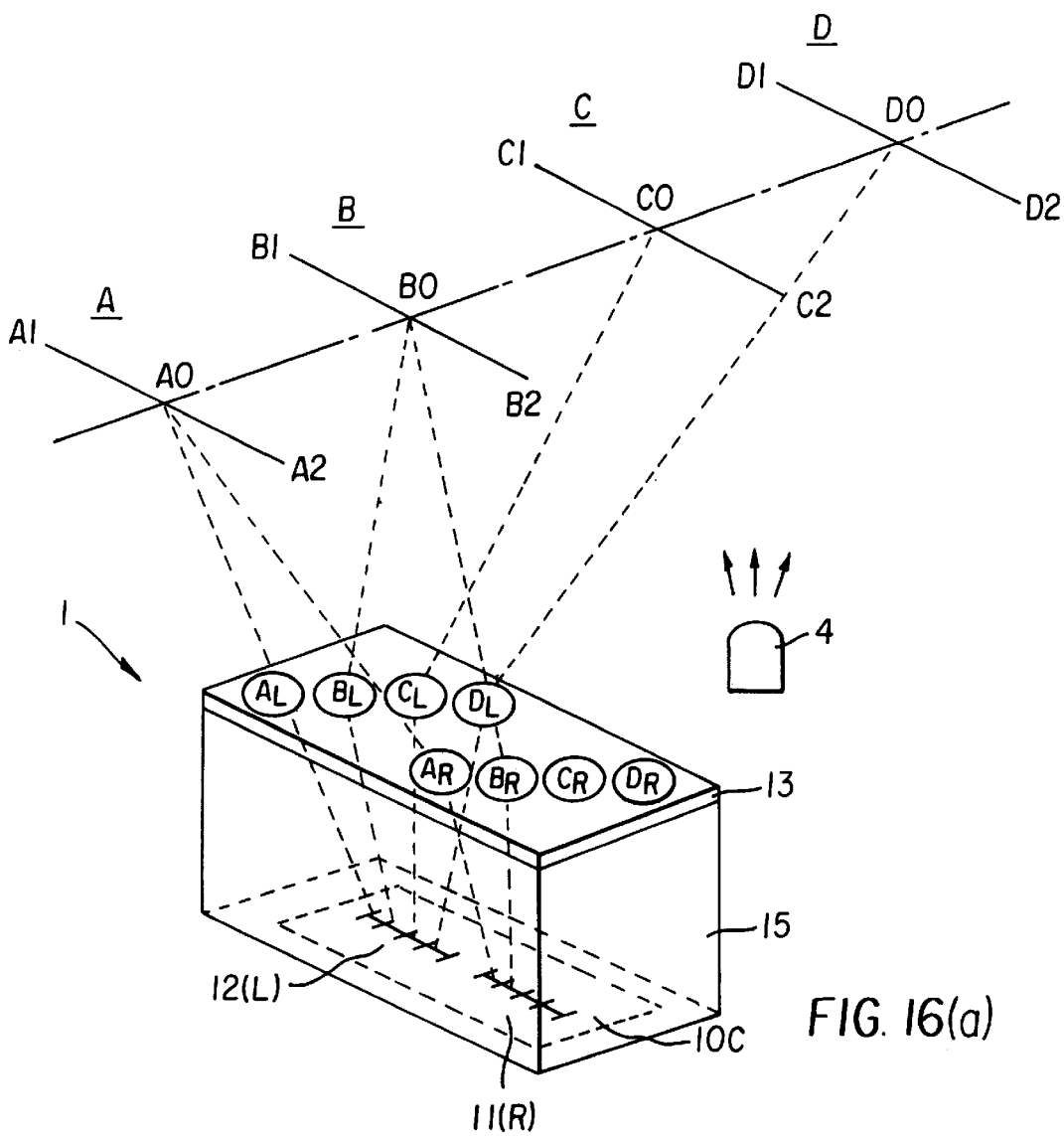
FIG. 16 is a view explaining the sixth embodiment of the present invention.
Figure 16B:
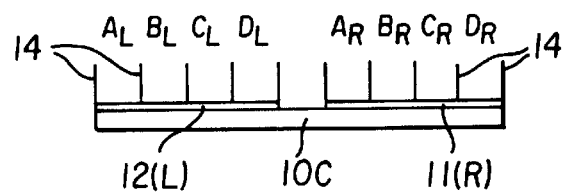

FIG. 16 is a schematic view showing the sixth embodiment of the present invention. An occupant sensor 1 of this embodiment is constructed such that a single-stage photoresponsive IC (10C) consisting of a pair of photosensor arrays 11(R), 12(L) and an imaging lens unit 13 are formed as a unit within a case 15. In this case, each of the photosensor arrays 11, 12 of the single-stage photoresponsive IC (10C) is divided by shielding plates 14 into four regions, as shown in FIG. 16(b), so as to provide a plurality of (four) monitor regions or fields of view A (A1, A0, A2), B(B1, B0, B2), C (C1, C0, C2), D (D1, D0, D2), and each lens is provided with respect to a corresponding region of the photosensor arrays, as shown in FIG. 16(a). In this arrangement, four fields of view A, B, C, D can be established by each of the photosensor arrays 11, 12. This means that only one pair of photosensor arrays can form images of a subject (occupant) from the four fields of view A, B, C, D, without scanning the subject as the embodiment of FIG. 11.

In control of inflating an air bag, it is desirable to take account of not only the presence of a vehicle occupant and his/her posture, but also the weight of the occupant (to distinguish between an adult and a child, and between a male and a female). In this case, the weight of the occupant may be measured by a weight detecting sensor, such as a pressure sensor, but the provision of such a sensor will increase the cost of the whole control system. Thus, in the following embodiment, a plurality of pairs of linear photosensor arrays each having a plurality of photosensor elements are used for measuring the weight of the occupant as well as the presence and posture of the occupant in the automobile, so as to reduce the cost of the control system.

FIG. 17 is a view explaining one embodiment of the present invention developed from the above point of view. FIG. 18 shows the relationship between a vehicle seat or occupant and the fields of view corresponding to the graphs of FIG. 17. FIG. 18(a) is a perspective view of a seat on which no occupant sits, (a)' is a side view corresponding to FIG. 18(a), FIG. 18(b) is a perspective view of a vehicle occupant when he/she sits in a normal posture, (b)' is a side view corresponding to FIG. 18(b), FIG. 18(c) is a perspective view of a vehicle occupant when he/she leans forward, and (c)' is a side view corresponding to FIG. 18(c).

More specifically, the occupant sensor 1 is attached to a central portion of the ceiling of the vehicle as in the embodiment of FIG. 1, so as to define horizontal fields of view with respect to the vehicle seat and obtain distance distribution data for each field of view. In particular, the occupant sensor 1 is adapted to monitor the abdominal or hypogastric portion (portion under the waist) of the occupant so as to detect the weight of the occupant.

Figure 17A:
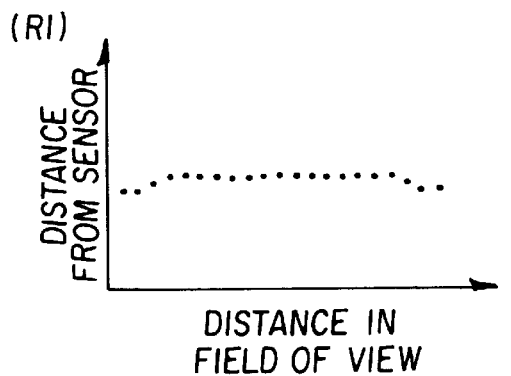
FIG. 17 is a view explaining the seventh embodiment of the present invention.
Figure 17A:
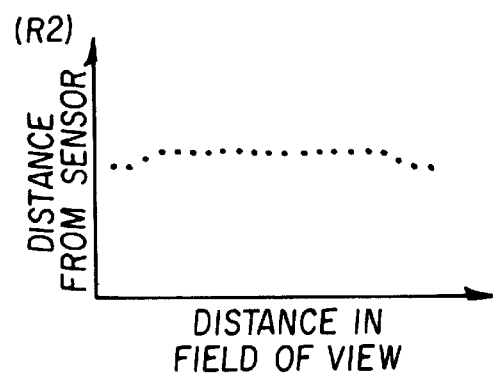
Figure 17A:
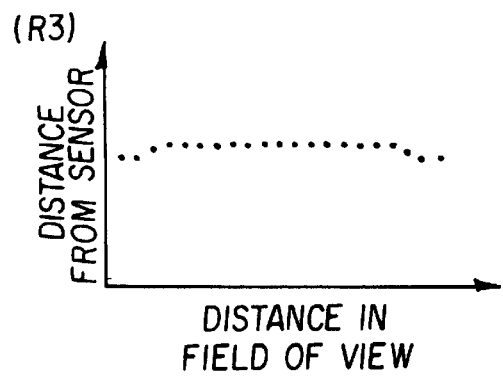
Figure 17A:
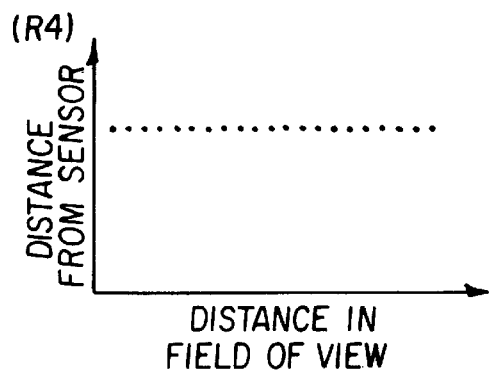
Figure 17B:
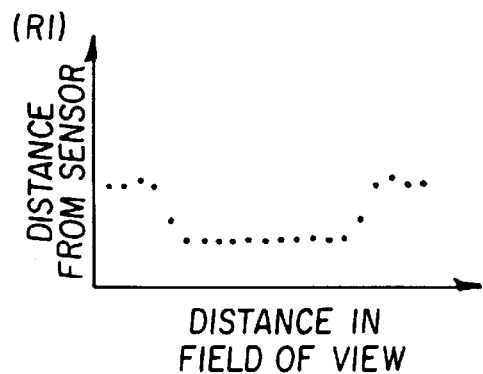
Figure 17B:
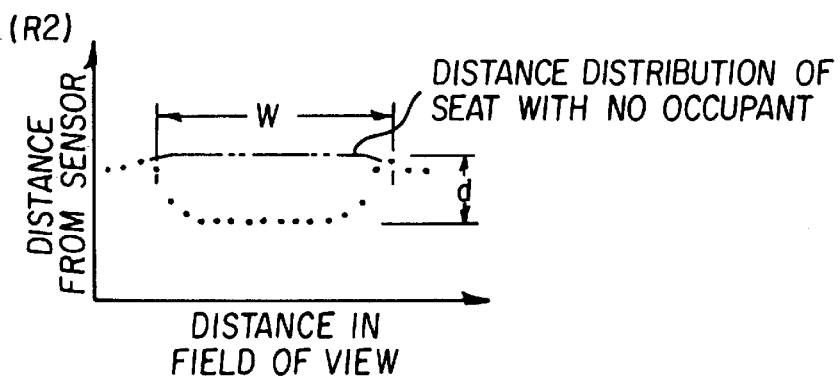
Figure 17B:
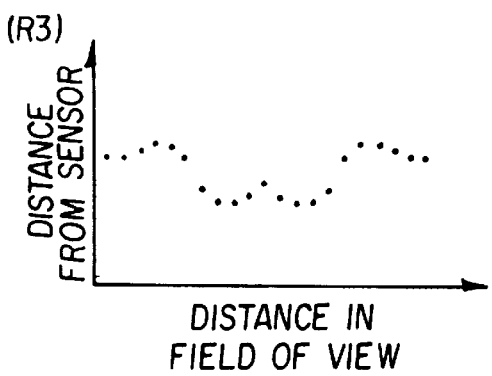
Figure 17B:
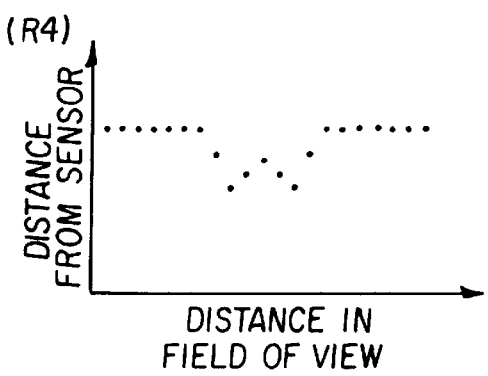
Figure 18C:
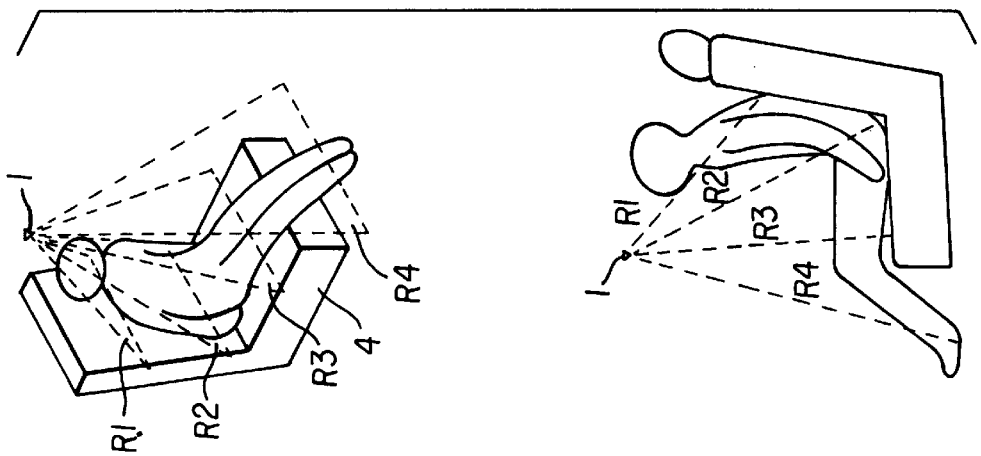
FIG. 18 is a view explaining the relationship among a seat, an occupant and fields of view.
Figure 18B:
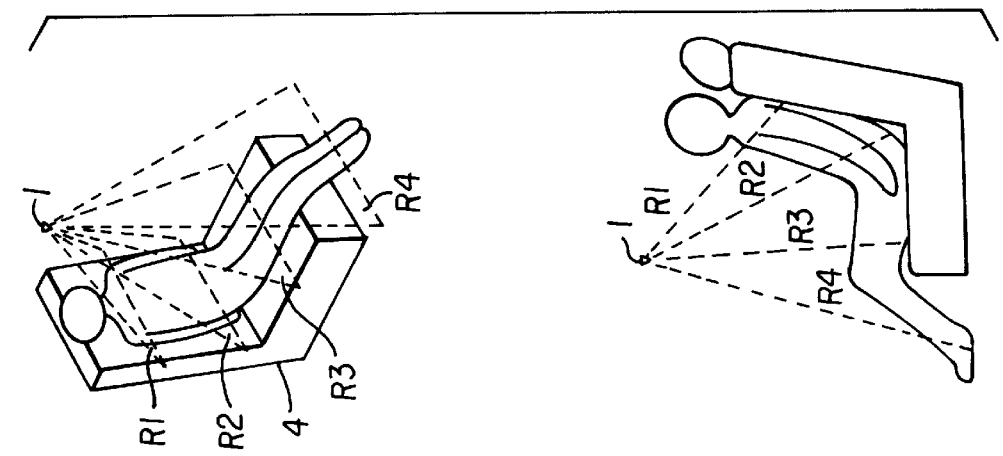
Figure 18A:
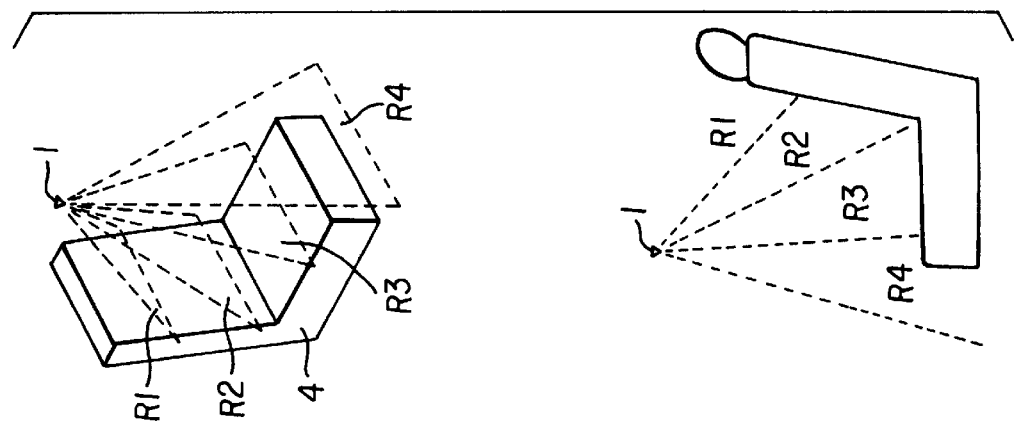

FIG. 17(a) shows distance distribution data when no occupant sits in the seat, and FIG. 17(b) shows distance distribution data when the occupant sits in the normal posture, while FIG. 17(c) shows distance distribution data when the occupant is in the forward leaning posture. The axis of ordinates in these distance distribution data indicates a distance value from the sensor, and the axis of abscissas indicates a position within the relevant field of view.

The presence and posture of the vehicle occupant are determined based on the distance distribution data for each field of view, in the manner as described above. In the following, therefore a method of detecting the weight of the occupant will be explained.

In this embodiment, the sensor 1 monitors the portion of the seat located around the waist of the occupant, and is thus able to examine the abdominal portion of the occupant even if he/she leans forward to some extent, by paying an attention to the data of the field of view R2 in FIGS. 17(b), (c). Namely, distance distribution data representing a seat with no occupant as indicated by one-dot chain line is superposed on actual distance distribution data indicated by discrete points (representing the distance from the sensor) as shown in FIGS. 7(b), (c), so as to obtain a cross section of the abdominal portion of the occupant.

The physique or build, such as a large build or a small build, of the occupant may be known from the width W of the cross section of his/her abdominal portion, and the fat, normal or slender figure (degree of obesity) may be known from this information relating to the physique and the thickness d of the cross section of the abdominal portion.

In the present embodiment, the statistics of the weight in relation to the width W and thickness d of the cross section of the abdominal portion are prepared in advance and stored in a certain memory, such that the weight can be determined based on the statistics stored in the memory once the width "W" and thickness "d" of the cross section of the abdominal portion are obtained. Although the weight may only be represented as a general value, this method suffices in actual applications if numerous statistic data are collected.

Figure 19:
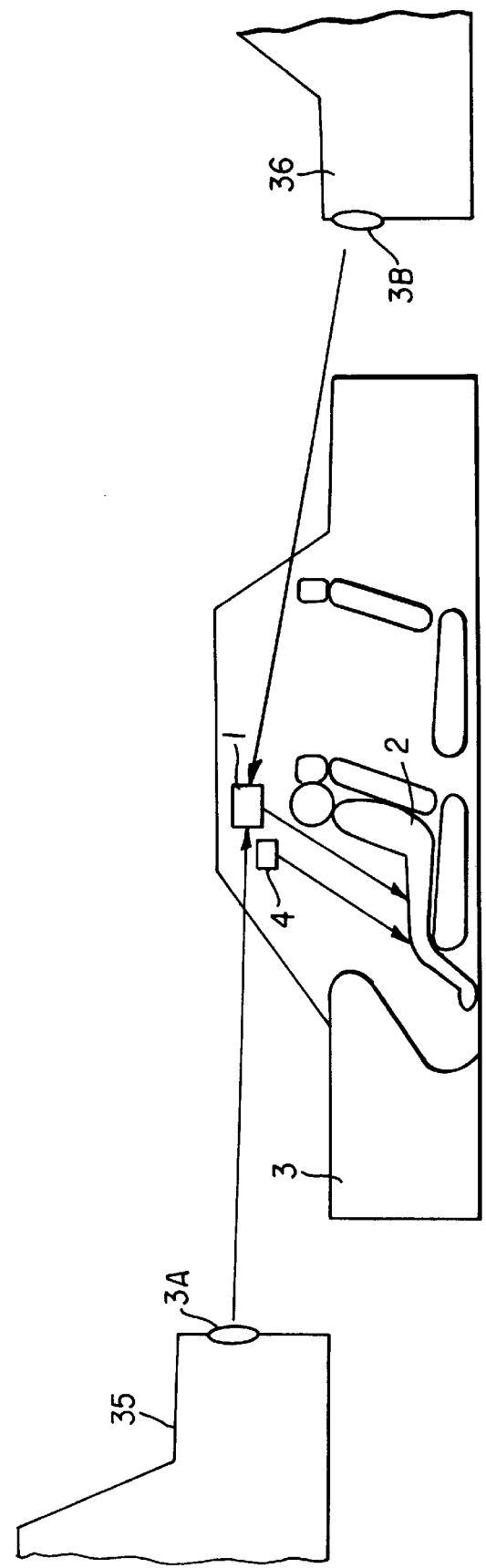
FIG. 19 is a schematic view explaining the eighth embodiment of the present invention.

In the occupant sensor of FIG. 12, the shielding coating is applied to the portions of the lenses 21, 22 other than their effective portions, so as to avoid wrong operations of the sensor caused by so-called stray light from an automobile running on the opposite lane or running behind the present automobile. There are, however, many situations in which influences of the stray light cannot be sufficiently eliminated. This problem may be solved in the manner as described below. FIG. 19 is a schematic view explaining another embodiment of the present invention.

In this embodiment, an optical sensor 1 and an auxiliary light source 4 are provided in the vicinity of a ceiling of an automobile 3, such that an image of an occupant 2 is formed by the optical sensor 1. In this arrangement, light beams 3A, 3B from an automobile 35 running on the opposite lane or an automobile 36 running behind the automobile 3 may reach the optical sensor 1 as stray light. According to the present invention, therefore, the output of the optical sensor 1 is processed in the manner as described below, using a processing unit that is not illustrated, so that the influences of the stray light are eliminated. FIG. 20 shows an example of the processing method.

Figure 20A:
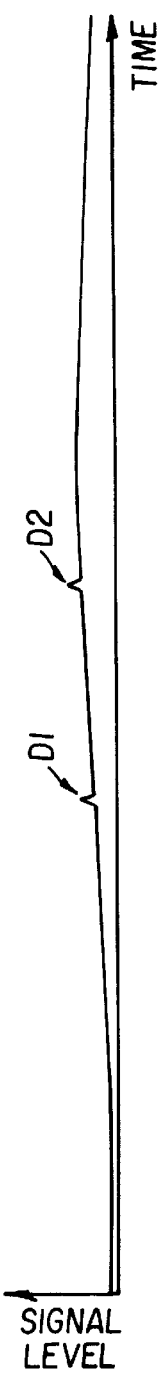
FIG. 20 is a view explaining a method of processing the output of the sensor of FIG. 19.
Figure 20B:
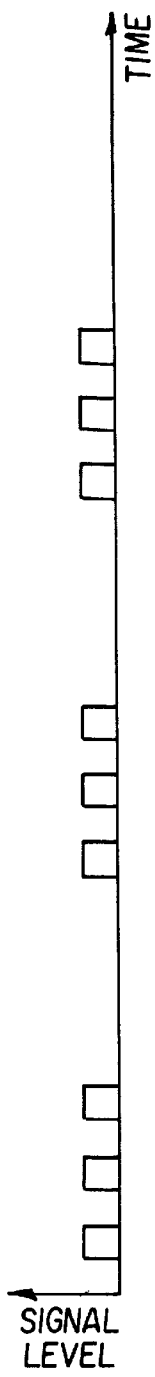
Figure 20C:
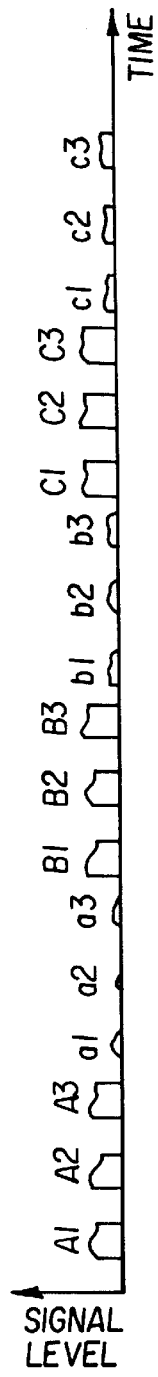
Figure 20D:
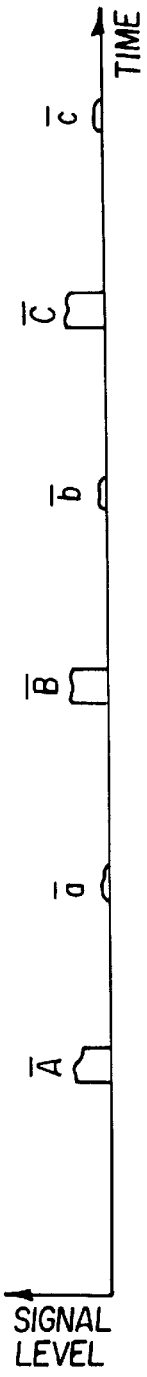

If the auxiliary light for illuminating the subject is emitted by the auxiliary light source 4 in the timing as shown in FIG. 20(b), and the optical sensor generates signals as shown in FIG. 20(c), the signals are averaged as shown in FIG. 20(d) by the processing unit that is not illustrated. Here, the average value of three signals A1, A2, A3 is represented by A(−). Although "−" is provided above the letter in the figure, it has the same meaning. FIG. 20(a) shows the stray light.

Similarly, while the auxiliary light source is not in the ON state (namely, in the OFF state), three output signals a1, a2, a3 of the optical sensor are obtained, and the average value a(−) of these signals is obtained by the processing unit that is not illustrated.

Figure 20E:
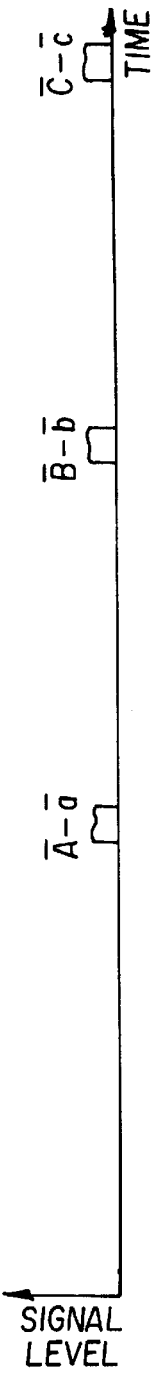

Subsequently, the output signals B, C and b, c of the optical sensor are obtained when the auxiliary light source is in the ON state and in the OFF state, respectively, and the averaging processing is performed so as to obtain B(−), C(−) and b(−), c(−). Then, differences between the average values A(−) and a(−), B(−) and b(−) and C(−) and c(−) are respectively obtained as shown in FIG. 20(e). As a result of these operations, image pickup information that is free from influences of stray light can be obtained by subtracting an increase in the light quantity due to the stray light, and thus eliminating the influences of the stray light that varies with time as shown in FIG. 20(a). Further, the influences of the stray light can be effectively eliminated even in the case where disturbances (refer to the arrows D1, D2 in FIG.

20(a)) occur at a shorter frequency than that of changes in the quantity of the stray light.

In the above-described embodiment, it is to be understood that the time interval of detection of the image while the auxiliary light source is ON, and the time interval of detection of the image while the auxiliary light source is OFF, are respectively made to be sufficiently shorter than the time or duration in which the stray light varies. While the averaging processing is performed in the above-described example, it is also possible to use differences between the sum of a plurality of consecutive output signals of the optical sensor obtained while the auxiliary light source is ON, and the sum of the same number of output signals of the optical sensor obtained while the auxiliary light source is OFF, or use this difference, along with the averaged values. Specifically, various values as shown in FIG. 2 are used to provide the differences between the respective signals. For example, the differences may be in the form of {(A1+A3)−(a1+a3)}, {(A1+A2+A3)−(a1+a2+a3)}, and so on.

According to the present invention, not only the presence of an occupant but also his/her posture can be detected based on the distance distribution of each portion of the occupant within each of monitor fields of view, which distance distribution is obtained by means of a single-stage (scanning type, plural-lens-type) or multistage occupant sensor. The result of the detection can be used in controlling inflation of an air bag, so as to avoid an accident that might otherwise occur upon inflation of the air bag, thus assuring increased safety and reliability. Since the acceleration can be calculated by arithmetic processing of the output of the distance sensor, there is no particular need to provide an exclusive acceleration sensor. Further, an optical system including the distance sensor may be designed so that the sensor can also detect an occupant whose part of the body is thrust out of automobile.

If sensor arrays are provided with respective lenses, and these sensor arrays and lenses are integrally formed using a transparent resin, with a shielding coating applied to portions of the lenses other than their effective portions, the size of the resulting occupant sensor can be reduced, and detection of stray light can be avoided. In addition, an auxiliary light source for illuminating monitor fields of view is adapted to emit a high intensity (high luminance) of illuminating light when the acceleration, such as an impact, becomes equal to or greater than a predetermined value, thus assuring improved measuring accuracy. This auxiliary light source may consist of a semiconductor laser light source and a hologram, in which case the size and cost of the auxiliary light source can be advantageously reduced.

The weight, as well as the presence and posture of the occupant, may be detected so as to permit more appropriate control in inflating an air bag. Further, since the output of the photosensor arrays may be utilized so as to eliminate influences of stray light, the cost of the control system can be reduced, assuring improved safety and reliability.

What is claimed is:

1. A control method for inflating an air bag for an automobile, said control method comprising:

providing at least one pair of linear photosensor arrays each consisting of a plurality of photosensor elements for forming an image of an occupant, so as to measure distance distribution of the image of the occupant located in at least one linear field of view; and detecting the presence and posture of the occupant, wherein the inflation of the air bag is controlled based on a result of detection of the presence and posture of the occupant;

wherein at least two pairs of said photosensor arrays are provided, and at least one of said at least two pairs of the photosensor arrays defines a field of view at a predetermined position in a horizontal direction, and wherein a warning is given when the image of the occupant is detected at a predetermined distance in the horizontal direction as measured from said at least one pair of the photosensor arrays.

2. A control method for inflating an air bag for an automobile as defined in claim 1, further comprising detecting an acceleration of movement of the occupant based on a rate of changes per unit time of distance values measured by said photosensor arrays, and using the detected acceleration is used for controlling inflation of the air bag.

3. A control method for inflating an air bag for an automobile, wherein said control method comprising:

providing at least one pair of linear photosensor arrays, each consisting of a plurality of photosensor elements, and a galvano-mirror for successively forming an image of an occupant, so as to measure distance distribution of the image of the occupant located in at least one linear field of view; and detecting the presence and posture of the occupant, wherein the inflation of the air bag is controlled based on a result of detection of the presence and posture of the occupant.

4. A control method for inflating an air bag for an automobile, said control method comprising:

providing at least one pair of linear photosensor arrays each consisting of a plurality of photosensor elements for forming an image of an occupant, so as to measure distance distribution of the image of the occupant located in at least one linear field of view; and detecting the presence and posture of the occupant, wherein the inflation of the air bag is controlled based on a result of detection of the presence and posture of the occupant;

wherein said photosensor arrays are provided with respective lenses, said sensor arrays and said lenses being integrally formed using a transparent resin, and wherein a shielding coating is applied to portions of said lenses other than effective portions thereof.

5. A control method for inflating an air bag for an automobile as defined in claim 4, further comprising providing an auxiliary light source for illuminating said linear fields of view, and turning on said auxiliary light source to emit a high intensity of light when an acceleration becomes equal to or greater than a predetermined value, for measurement of the distance distribution.

6. A control method for inflating an air bag for an automobile as defined in claim 5, wherein said auxiliary light source comprises a semiconductor laser light source, and a hologram that receives a laser beam emitted by said semiconductor laser light source, and generates a pattern of stripes that extend in a direction perpendicular to said linear fields of view.

7. A control method for inflating an air bag for an automobile, wherein each of a pair of linear photosensor arrays each consisting of a plurality of photosensor elements is divided into a plurality of regions, and wherein a lens is provided with respect to each of said regions, so as to form an image of a part of an occupant on a corresponding one of said regions, at least one distance distribution of said image of the part of the occupant being measured so as to detect the presence and posture of the occupant, wherein the inflation of the air bag is controlled based on a result of detection of the presence and posture of the occupant.

8. A control method for inflating an air bag for an automobile, said control method comprising:

providing a plurality of pairs of linear photosensor arrays each consisting of a plurality of photosensor elements for forming an image of an occupant, so as to measure distance distribution of the image of the occupant located in at least one linear field of view; and detecting the presence and posture of the vehicle occupant, while at the same time calculating a width and a thickness of a cross section formed in the distance distribution to represent an abdominal portion of the vehicle occupant, so as to detect a weight of the occupant by reading out information preliminarily stored in relation to the width and thickness, wherein the inflation of the air bag is controlled based on a result of detection of the presence and posture of the occupant and the weight of the occupant.

* * * * *